United States Patent [19]

Bernadic

[11] Patent Number: 5,180,258
[45] Date of Patent: Jan. 19, 1993

[54] HIGH FEED HEAVY DEPTH OF CUT INSERT FOR THE ALUMINUM WHEEL TURNING MARKET

[75] Inventor: Thomas J. Bernadic, Madison Heights, Mich.

[73] Assignee: GTE Valenite Corporation, Troy, Mich.

[21] Appl. No.: 767,182

[22] Filed: Sep. 30, 1991

[51] Int. Cl.⁵ .............................................. B23B 27/22
[52] U.S. Cl. ..................................... 407/114; 407/116
[58] Field of Search ................................. 407/113–116

[56] References Cited

U.S. PATENT DOCUMENTS

| | | | |
|---|---|---|---|
| 4,447,175 | 5/1984 | Warren | 407/114 |
| 4,629,371 | 12/1986 | Maeda et al. | 407/114 |
| 4,710,069 | 12/1987 | Loqvist | 407/114 |
| 4,934,879 | 6/1990 | van Barneveld | 407/113 X |
| 5,044,840 | 9/1991 | Fouquer et al. | 407/114 |

*Primary Examiner*—Steven C. Bishop
*Attorney, Agent, or Firm*—Bill C. Panagos

[57] ABSTRACT

A high feed/heavy depth of cut indexable insert for the aluminum wheel turning market featuring a cutting edge with higher elevation than the central island chipbreaker forms.

3 Claims, 2 Drawing Sheets

HIGH FEED HEAVY DEPTH OF CUT INSERT FOR THE ALUMINUM WHEEL TURNING MARKET

BACKGROUND OF THE INVENTION

1. Field of the Invention

The present invention relates to disposable cutting inserts which may be detachable mounted on a tool holder for cutting a workpiece. Cutting inserts of this type are generally made of cemented carbide and are formed by pressing and sintering techniques.

2. Description of the Related Art

Standard geometries of past inserts have mainly consisted of a chipbreaker design extending away from the cutting edge which forms a central island thereby creating a top surface of an insert geometry which is always slightly above the cutting edge. This type of design makes it possible to break the metal chips into small manageable fragments. However, it has been observed that this type of design may limit the insert's ability to travel along the workpiece material at higher revolutions per minute, and at greater depths of cut. At heavier machining conditions, the chips begin to crowd within the chip groove, thereby decreasing the life of the insert and smearing the finish of the part machined.

The insert of the present invention provides for a chipbreaker which is lower than the cutting edge, thereby allowing for greater feed rates and depth of cut.

SUMMARY OF THE INVENTION

The present invention is a high feed/heavy depth of cut insert for the aluminum wheel turning market. The chipbreaker configuration in this new design is lower than the cutting edge, thereby allowing for greater feed rates at higher depths of cut. The design of the present invention further includes separate island forms thereby allowing the workpiece material to flow between the chipbreaker design elements thus causing an increase in the material removal rate.

In addition, the special inverted cavities of the present invention were designed into the secondary angle along the flanks of the insert. These toothlike cavities are designed to reduce the friction forces which are produced at the sheer zone interface. Also, these cavities assist in bending the material removed before making contact with the main chipbreaker form located on the bottom of the chip groove. This preliminary bending of the material adds more stress strain concentration within this type of material which helps break the material into controllable chips.

DETAILED DESCRIPTION OF THE PREFERRED EMBODIMENT

Figure 1:
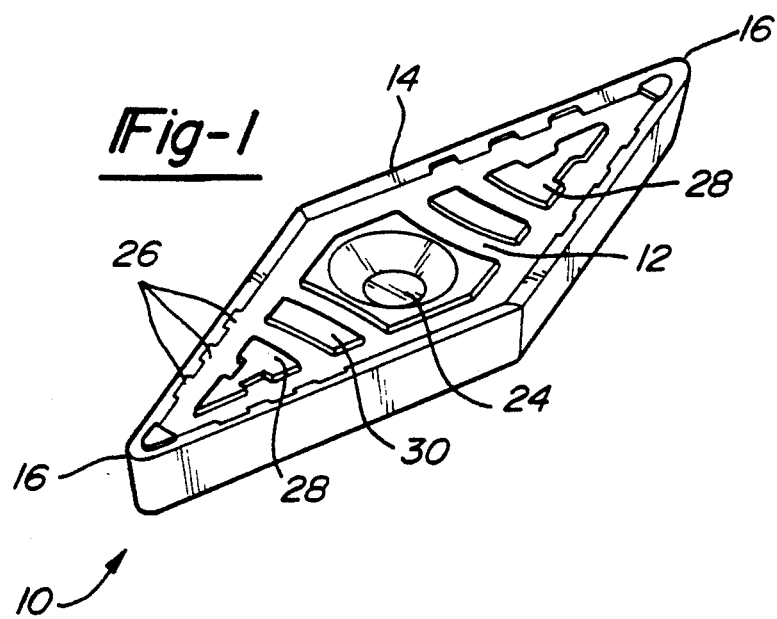
FIG. 1 is a top plan view of the insert of the present invention.

FIG. 1 is a top plan view of the insert of the present invention. Insert 10 is shown as polygonal, having a top surface 12, a bottom surface and side flanks 14 extending substantially unbroken therebetween to form the body of the insert. The insert is equipped with nose portions 16, formed by the intersection of the flank sides of the insert.

The upper surface has a cutting edge 18, a descending land 20 and a generally recessed surface 22, which is of lower elevation than the cutting edge 18. The surface 22 is provided with a recess 24 which passes partially through the insert body. The recess is configured such that the insert may be clamped into place on the seating surface of a tool, not shown, and presented to the workpiece, such as is customary in the art. Those skilled in the art will recognize that recess 24 may also be an aperture extending through the body of the insert.

The land has notches 26 therein to aid in chip removal during high feed and heavy cut rates. The notches in the land reduce and distribute the pressures on the cutting edge by decreasing the friction being produced at the shear zone interface of the insert. Also, these notches aid in bending the material before making contact with the main chipbreaker forms 28 and 30, located at the bottom of the chip groove 23. This preliminary bending of the material adds more stress/strain concentration within this type of material which helps break the material into controllable chips. It is contemplated that the notches may be either "inverted" vis-a-vis the land, or protrude outwardly from the land, depending upon the application and the desired results.

Figure 3:
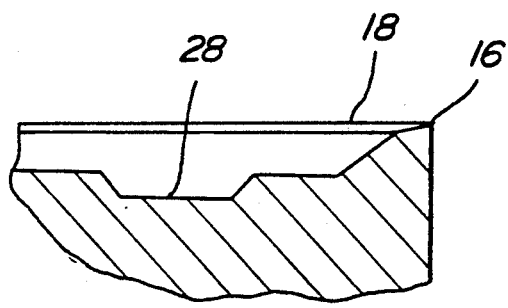
FIG. 3 is a sectional view taken along line A—A

FIG. 3 is a cross sectional view of the insert taken along line A—A. It can be seen that along the nose of the insert, the cutting edge is only slightly higher in elevation than the chipbreaker form 28. This is important as the chipbreaker adds strength to the nose portion, thereby allowing improved impact strength to the insert and minimizing catastrophic failure of the insert during use.

Figure 4:
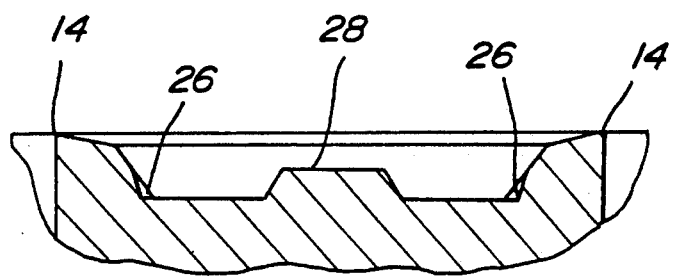
FIG. 4 is a sectional view taken along line B—B

FIG. 4 is a sectional view of the insert taken along line B—B, again illustrating the elevation of the cutting edge relative to the chipbreaker form.

Figure 5:
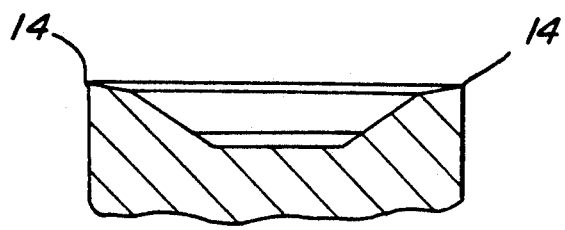
FIG. 5 is a sectional view taken along line C—C
Figure 2:
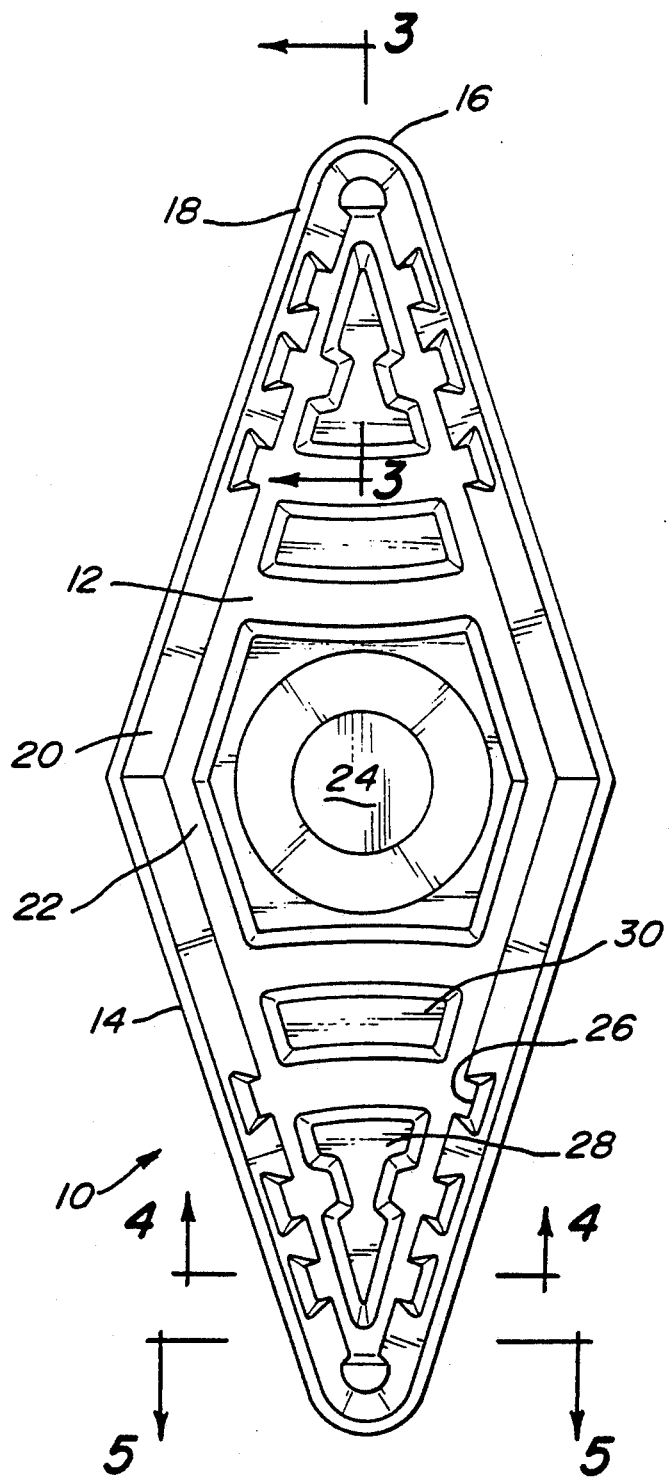
FIG. 2 is a perspective view of the insert of the present invention.

FIG. 5 is a sectional view of the insert taken along line C—C. Again, it can be seen that the cutting edge is of higher elevation that the recesses surface 22, which serves as the chip groove of the insert.

While one embodiment has been discussed, it will become apparent to those skilled in the art that many variations are possible without departing from the scope and spirit of the invention.

We claim:

1. An indexable polygonal insert for high feed and heavy depth of cut, comprising:
   an upper surface, a lower surface adapted to be seated in a tool holder, and a side flank surface extending substantially unbroken therebetween to define the insert body, said upper surface having a cutting edge extending along the perimeter of the insert, a land surface rearward to the cutting edge and descending therefrom, a chipgroove surface rearward from said land and of lower elevation than said cutting edge, said upper surface further provided with an aperture extending at least partially through the insert, and chipbreaker islands to deform chips during cutting operations, said land further provided with a plurality of notches along the flank of the insert to aid in bending of removed material and distribute pressure on the cutting edge by decreasing friction to add stress/strain to the material to break the material into small chips, said insert further provided with at least one nose portion created by the intersection of the chip groove, land and cutting edges.

2. The insert of claim 1, wherein said insert has two nose portions.

3. The insert of claim 1, further including a stabilizer pad at each nose portion of the insert.

* * * * *

UNITED STATES PATENT AND TRADEMARK OFFICE
CERTIFICATE OF CORRECTION

PATENT NO. : 5,180,258
DATED : January 19, 1993
INVENTOR(S) : Thomas J. Bernadic, Brendan L. Brockett It is certified that error appears in the above—identified patent and that said Letters Patent is hereby corrected as shown below:

The named Inventors should read:
        Thomas J. Bernadic, Madison Heights, Michigan
        Brendan L. Brockett, Dearborn Heights, Michigan Signed and Sealed this Second Day of November, 1993

Attest:

BRUCE LEHMAN

*Attesting Officer*    *Commissioner of Patents and Trademarks*